JUNSHI MIYAMOTO and
YOSHISHIGE SATO,
Inventors

United States Patent Office 3,547,588
Patented Dec. 15, 1970

3,547,588
GASCHROMATOGRAPHIC DETERMINATION OF MINUTE AMOUNT OF ORGANOPHOSPHORUS COMPOUNDS
Junshi Miyamoto, Sakai, and Yoshishige Sato, Takarazuka, Japan, assignors to Sumitomo Chemical Co., Ltd., Osaka, Japan
Filed Jan. 7, 1969, Ser. No. 789,560
Claims priority, application Japan, Jan. 12, 1968, 43/1,770
Int. Cl. G01n 31/12
U.S. Cl. 23—232
4 Claims

ABSTRACT OF THE DISCLOSURE

Gaschromatographic method and apparatus in which a thermal ion type hydrogen flame detector is characterized by using a single crystal body of a halide of an alkali metal or alkaline earth metal as an ion source.

Figure 1:
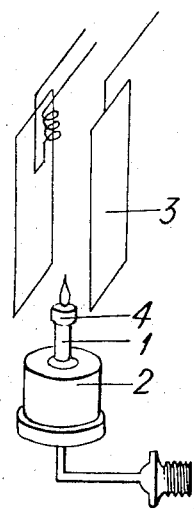

This invention relates to an improvement in an apparatus and method for analyzing a very minute amount of an organophosphorus compound remaining in an animal or plant body, and more particularly to the use of a shaped body of single crystals of a halide of an alkali metal or alkaline earth metal as an ion source in a hydrogen flame detector of a gas-chromatograph which is known per se.

It is very important from the viewpoint of food sanitation and others to analyze a minute amount of an organophosphorus compound remaining in an animal or plant body. From its necessity, various analysing methods have been developed in recent years. For example, there has recently been coming to be used a method wherein a phosphorus compound is separated from a sample with a gas-chromatograph and is then detected with a thermal ion type hydrogen flame detector having a sensitivity peculiar to a phosphorus compound.

The thermal ion type hydrogen flame detector so called here is a detector to quantitatively determine a minute amount of an organophosphorus compound by detecting thermal ions developed in response to the phosphorus compound. A halide (hereinafter referred to as metal salt) of an alkali metal or alkaline earth metal to be used as an ion source is mounted on a hydrogen flame nozzle and is kept heated with a flame of hydrogen. When an organophosphorus compound comes out as separated from a gas-chromatograph column and contacts the metal salt, the amount of the evaporation of thermal ions will increase peculiarly in response to the phosphorus compound, while the amount of the evaporation of thermal ions will never or little increase in response to a hydrocarbon or a compound containing other elements than phosphorus.

The problems, however, is how to stably and effectively hold the alkali metal or its salt in a hydrogen flame for a long period of time. Various methods have been proposed in this connection. As typical ones of them may be mentioned (a) a method, e.g. L. Giuffrida; J.A.O.A.C. 47 293 (1964) (generally known and called STD) wherein platinum or other suitable metal is used as a supporter, a salt is deposited by fusion on this supporter, which enclose the flame of hydrogen, and (b) a method, e.g. C. H. Hartman; Bull. Environ. Contamination and Toxicd., 1 159 (1966) wherein no metallic supporter is used but a binding agent is mixed with a salt and the mixture is press-molded and is fixed to the upper part of a nozzle for hydrogen flame. However, the system (a) has a disadvantage that the amount of the metal salt which can be deposited on the supporter is so small that the life of the detector fitted with it is very short (about 20 hours). Further, the level of the noise to be derived from the impurities involved in the fusing deposition or present in the metal salt itself is so high that pre-aging for a long time is required to remove the impurities and the detector is not endurable to the analysis in the high sensitivity zone and the continuous analysis for a long time. On the other hand, in system (b), the detector can be used for a long time but the level of the noise is so high that aging is required and the practical sensitivity is low.

One object of the present invention, therefore, is to provide a method of gas-chromatographic determination of minute amounts of organophosphorus compounds without accompanying the difficulties mentioned above.

Another object is to provide an improved gas-chromatographic apparatus having high detection sensitivity for organophosphorus compounds.

Other objects will be apparent from the following description.

These objects are accomplished according to the present invention by a method of gas-chromatographic determination of minute amounts of organophosphorus compounds characterized by using a single crystal body of a halide of an alkali metal or alkaline earth metal as an ion source in a thermal ion type hydrogen flame detector.

The present invention further provides a gas-chromatographic apparatus having high detection sensitivity for organophosphorus compound, comprising thermal ion type hydrogen flame detector, column, recorder, carrier gas flow rate controller, sample inlet and flow meter, characterized by the fact that a single crystal body of a halide of an alkali metal or an alkaline earth metal (as an ion source) is mounted on the thermal ion type hydrogen flame detector.

According to the method of the present invention, due to its low noise level and high detection sensitivity, a picogram ($1 \times 10^{-12}$ g.) unit of an organophosphorus compound can be detected and, by treating only several 10 grams of an animal or plant tissue, it is possible to detect a level of 0.001 p.p.m. of an organophosphorus compound and the apparatus can be continuously used for more than 200 hours. Further, when the upper surface of the tip of the metallic salt is reshaped it can endure the use for more than another 200 hours.

The single crystal body of an alkali metal or alkaline earth metal to be used in the present invention is of KBr, LiF, CsBr, $CaF_2$, $BaF_2$ or NaCl having a particularly excellent effect. Any single crystal which is produced in a known manner may be shaped into a proper form.

Figure 2:
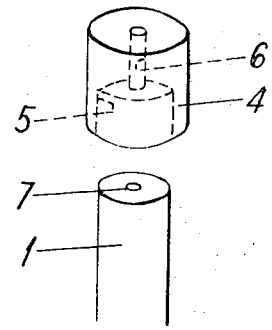
Figure 3:
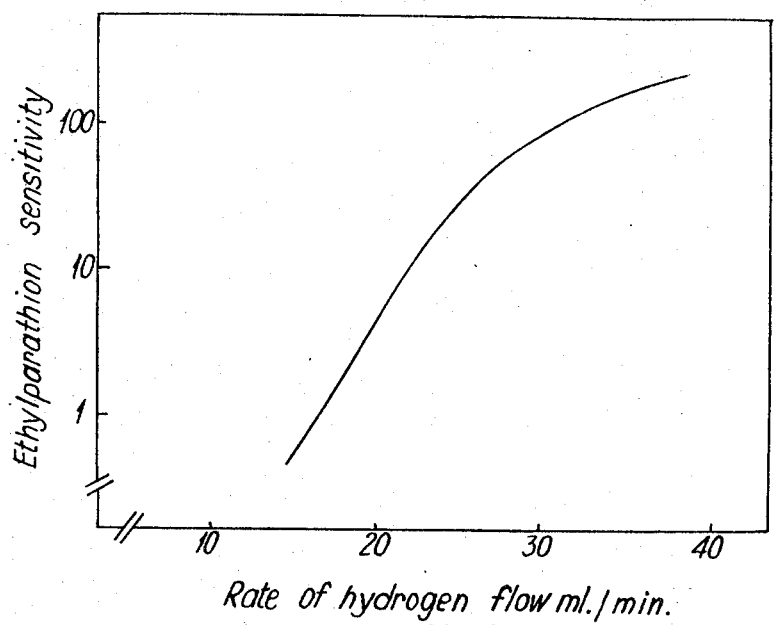

The invention will be further explained by referring to the accompanying drawings wherein:
FIG. 1 is a schematic view of a detector embodying the present invention;
FIG. 2 is an enlarged schematic view of a part of the apparatus shown in FIG. 1; and
FIG. 3 is a characteristic curve diagram of a detector of this invention.

Referring to FIGS. 1 and 2, indicated with the numeral 1 is a hydrogen nozzle which is supported by a nozzle supporter 2. An ion collector 3 is arranged above the hydrogen nozzle 1. The hydrogen flame detector of this type is well known per se and therefore no further explanation thereabout will be necessary. The detector is mounted in a known manner of a gas-chromatographic apparatus which is also known per se.

The important feature of the invention is to mount a single crystal body of a halide of an alkali metal or an alkaline earth metal on the hydrogen flame nozzle 1. In the embodiment shown, a single crystal body 4 is shaped in cylindrical form in which is formed a recess 5 and a hole 6 for flame passage. The dimension of the recess 5 is such that the single crystal body 4 can fit on the upper portion of the nozzle 1 and the hole 6 registers with an opening 7 of the nozzle 1.

The following examples illustrate this invention.

EXAMPLE 1

A single crystal body 4 of KBr was shaped as in FIG. 2 and was used as fitted to a thermal ion type hydrogen flame detector as shown in FIG. 1. In this case, a gas-chromatograph GC·3AF made by K. K. Shimazu Seisakusho, Kyoto, Japan was used.

The nozzle 1 was a ceramic pipe of a length of 8 mm. and an outside diameter of 2 mm. having an orifice of an inside diameter of about 0.2 mm. in the center. The shaped single crystal body 4 was of a length of 4 mm. and an outside diameter of 3.5 mm. having an orifice opening 6 of a diameter of about 0.2 mm. in the center and having a groove or recess 5 of an inside diameter of about 2.1 mm. and a length of 2 mm. so as to be in close contact with the upper part of the nozzle 1. The upper part of the nozzle 1 was inserted in the shaped single crystal body 4 to form a special detector nozzle of this invention. Generally, when this nozzle is used so that only one side of dual detectors is a special detector, a large electric current will flow to one side, no balance of the recorder will be taken and therefore the capacity of the mercury battery of the balance circuit of the electrometer will have to be made twice as large.

The required rate of flow of hydrogen is 15 to 35 ml./min. When the rate of flow of air is made constant at 250 ml./min. and the rate of flow of the carrier gas (He) is made 60 ml./min., the absolute detection sensitivity will vary with the variation of the volume of flow of hydrogen and will be $1 \times 10^{-9}$ to $1 \times 10^{-11}$ g. for an organphosphorus compound of a molecular weight of about 250 containing one phosphorus element (see FIG. 3).

EXAMPLE 2

By using the apparatus of Example 1, ethylparathion $[(C_2H_5O)_2P(S)OC_6H_4NO_2]$ was detected.

The ethylparathion was separated under the conditions of a rate of flow of hydrogen of 25 ml./min., rate of flow of a carrier gas (He) of 60 ml./min., temperature of 200° C. and column filler of DC·200:QF-1 of 4:8. When the detector base line current showed $2 \times 10^{-8}$ amp. and the recorder was set at $10^{-10}$ AFS, the full scale was $5 \times 10^{-10}$ g. for ethylparathion and the detection could be easily made up to about $1 \times 10^{-11}$ g. At this time, the base line noise level was 1/100 full scale and the drift level showed 1/100 full scale/10 min. These numeral values are much higher than in any other detector of this kind.

What we claim is:

1. A method of gas-chromatographic determination of minute amounts of organophosphorus compounds characterized by using a single crystal body of a halide of an alkali metal or alkaline earth metal as an ion source of a thermal ion type hydrogen flame detector.

2. A method according to claim 1, wherein the halide of an alkali metal or alkaline earth metal is KBr, LiF, CsBr, $CaF_2$, $BaF_2$ or NaCl.

3. A gas-chromatograph apparatus having high detection sensitivity for organophosphorus compound, comprising a thermal ion type hydrogen flame detector characterized by the fact that a single crystal body of a halide of an alkali metal or an alkaline earth metal is used as the ion source of the thermal ion type hydrogen flame detector.

4. A gas-chromatograph apparatus according to claim 3, wherein the halide of an alkali metal or alkaline earth metal is KBr, LiF, CsBr, $CaF_2$, $BaF_2$ or NaCl.

References Cited

UNITED STATES PATENTS

| | | | |
|---|---|---|---|
| 3,372,994 | 3/1968 | Giuffrida | 23—254E |
| 3,423,181 | 1/1969 | Dimick et al. | 23—254E |

MORRIS O. WOLK, Primary Examiner

R. M. REESE, Assistant Examiner

U.S. Cl. X.R.

23—254